United States Patent
Santelli

(10) Patent No.: US 9,768,817 B2
(45) Date of Patent: Sep. 19, 2017

(54) CELL PHONE CASE AND METHOD OF MANUFACTURING THE SAME BY BLENDING AN ADDITIVE WITH A POLYMER

(71) Applicant: Al Santelli, Middlesex, NJ (US)

(72) Inventor: Angie Santelli, Middlesex, NJ (US)

(*) Notice: Subject to any disclaimer, the term of this patent is extended or adjusted under 35 U.S.C. 154(b) by 0 days.

(21) Appl. No.: 14/587,400

(22) Filed: Dec. 31, 2014

(65) Prior Publication Data
US 2016/0191095 A1 Jun. 30, 2016

(51) Int. Cl.
*H04B 1/3888* (2015.01)
*A45C 11/00* (2006.01)

(52) U.S. Cl.
CPC ...... *H04B 1/3888* (2013.01); *A45C 2011/002* (2013.01); *A45F 2200/0516* (2013.01)

(58) Field of Classification Search
CPC ........ H04B 1/3888; H04M 1/21; H04M 1/04; A45C 2011/002; A45C 2011/003; A45F 2200/0516
See application file for complete search history.

(56) References Cited

U.S. PATENT DOCUMENTS

| | | | |
|---|---|---|---|
| 8,155,706 B1 | 4/2012 | Hurst | |
| 2004/0259178 A1* | 12/2004 | Bodenhamer | G01N 33/56911 435/7.92 |
| 2007/0224275 A1* | 9/2007 | Reid | A01N 55/00 424/489 |
| 2008/0230751 A1* | 9/2008 | Li | C08L 69/00 252/582 |
| 2009/0208721 A1* | 8/2009 | Tsuchiya | B29C 45/14786 428/220 |
| 2009/0324536 A1* | 12/2009 | Sun | A01N 43/40 424/78.23 |
| 2011/0015615 A1* | 1/2011 | Cichos | C08K 3/005 604/523 |
| 2011/0076504 A1* | 3/2011 | Van De Weerdt | C08F 220/34 428/463 |
| 2012/0261930 A1* | 10/2012 | Bethea | A45F 5/00 294/25 |
| 2012/0301528 A1* | 11/2012 | Uhlmann | A01N 59/16 424/405 |
| 2013/0235546 A1* | 9/2013 | Sedillo | H05K 7/02 361/809 |
| 2013/0315972 A1* | 11/2013 | Krasnow | A01N 25/12 424/409 |
| 2014/0213728 A1* | 7/2014 | Kosaka | C08F 297/08 525/97 |
| 2015/0174803 A1* | 6/2015 | Newman | B29C 45/14 264/40.1 |
| 2016/0114958 A1* | 4/2016 | Busche | B65D 81/28 424/78.29 |
| 2016/0212252 A1* | 7/2016 | Parker | H04M 1/17 |

* cited by examiner

*Primary Examiner* — Devan Sandiford
(74) *Attorney, Agent, or Firm* — Porzio Bromberg Newman P.C.

(57) ABSTRACT

A cell phone case including an additive for providing desired properties of the cell phone case. The additive can be a fragrance for improving a scent of the cell phone case. The additive can also include a antimicrobial agent to create an antimicrobial device effective in reducing or eliminating bacteria on a surface of the cell phone case.

5 Claims, 2 Drawing Sheets

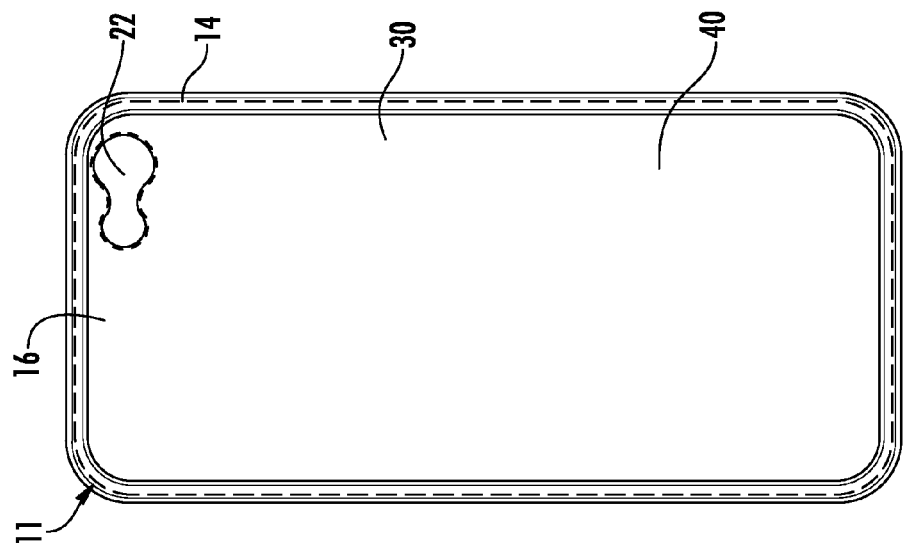
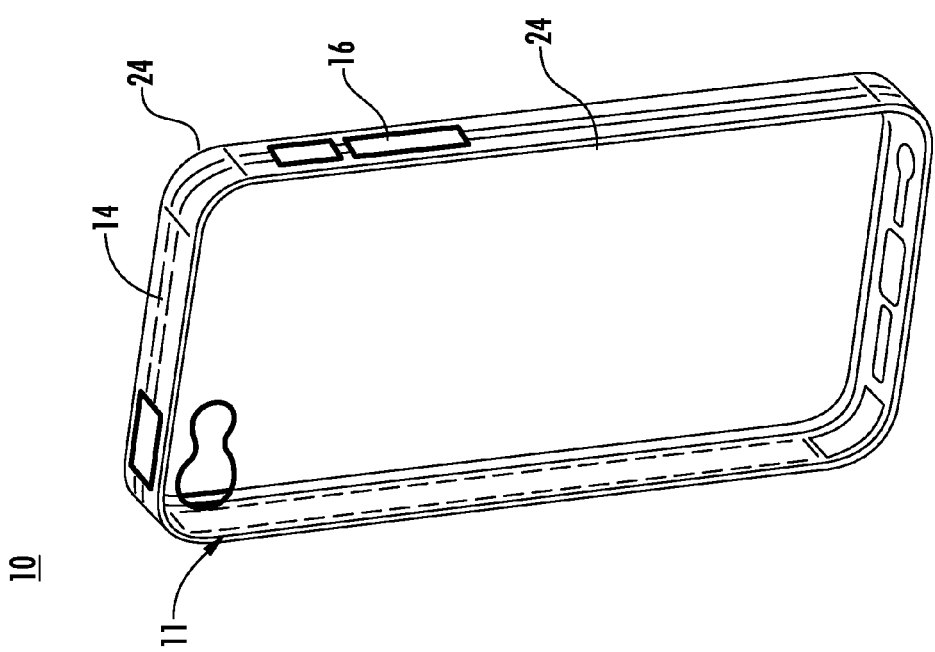

CELL PHONE CASE AND METHOD OF MANUFACTURING THE SAME BY BLENDING AN ADDITIVE WITH A POLYMER

BACKGROUND OF THE INVENTION

Field of the Invention

The present invention relates to a cell phone case including antimicrobial and/or fragrance properties.

Description of Related Art

Cell phones have become a primary communication device for a majority of the public. Cell phone cases are used to protect the cell phone to make the cell phone more rugged. A variety of colors and designs are used to provide an appealing appearance of the cell phone case.

Conventional technologies have incorporated features into a cell phone case. U.S. Pat. No. 8,155,706 describes a scent notification system operably coupled to a conventional cellular phone wherein the scent notification system is configured to alert the cellular phone user to an incoming communication via dispersal of a fluid having a specific aromatic property. The scent notification system further includes a housing that is operably coupled to the cellular phone. The housing has an interior volume that has contained therein at least one cartridge containing a fluid and an expansion chamber operably coupled thereto. The cartridge further includes a propellant to propel the fluid from the cartridge to the expansion chamber where the fluid converts to a gaseous phase and then propagates out of the expansion chamber via a nozzle. The cartridge can utilize compressed gas, chlorofluorocarbons, LPG, or dimethyl ether as a propellant to assist in the dispersal of the fluid. The propellant is stored under high pressure and functions to propel the fluid disposed within the cartridge out through the channel and into the expansion chamber and subsequently propagating out the nozzle.

It is desirable to provide a customizable cell phone case including a microbial and/or fragrance incorporated into the cell phone case without using a propellant having low manufacturing costs.

SUMMARY OF THE INVENTION

The present invention relates to a cell phone case including an additive for providing desired properties of the cell phone case. The additive can include a fragrance for improving a scent of the cell phone case. The additive can also include a antimicrobial agent to create an antimicrobial device effective in reducing or eliminating bacteria on a surface of the cell phone case. The cell phone case can have antimicrobial properties of 99.9% using a suitable microbial agent of silver.

The cell phone case can be formed of a plastic or thermoplastic material formed from the polymerization of olefins. In one embodiment, the additive can be added to a polyolefin used for injection molding of the cell phone case. In one embodiment, the polymer can be a polyurethane. The polyurethane can be a thermosetting or thermoplastic material. Other thermoplastic materials that can be used to form the cell phone case include ethylene vinyl acetate and nylon.

The cell phone case can be formed from a blended polymer compound with the additive. Processing of the blended polymer compound results in the additive being infused or trapped in the polymer. In one embodiment, the additive is a fragrance oil for polymer and/or antimicrobial which is blended into polyurethane. The blended polymer compound can be injection molded into the shape of the cell phone case.

When an antimicrobial additive is used in the cell phone case and the cell phone case comes in contact with other materials such as human skin and or sensitive tissue, the microbial agent entrapped in the polymer has minimal contact with the application. This provides the cell phone case with a non-leaching property of the microbial agent. The antimicrobial additive can attract and kill microbes on a surface of the cell phone case.

Surface texture of the cell phone case can be used to increase attraction and retention of microbes to the cell phone case from the host environment by capillary action. Surface treatments can be applied to the cell phone case for increasing the surface tension thereby aiding in the adhesion of microbes during use of the cell phone cases. The surface treatments can be applied by means of flame or corona treatment of the surface.

The invention will be more fully described by reference to the following drawings.

BRIEF DESCRIPTION OF THE DRAWINGS

FIG. 1A is a perspective view of a cell phone case including antimicrobial and/or fragrance in accordance with the teachings of the present invention.

FIG. 1B is a rear view of the cell phone case.

DETAILED DESCRIPTION

Figure 1C:
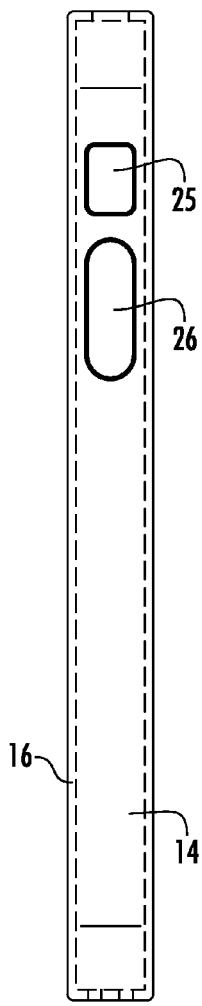
FIG. 1C is a side view of the cell phone case.
Figure 1D:
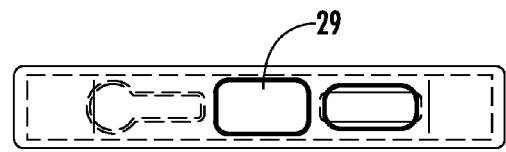
FIG. 1D is a bottom view of the cell phone case.
Figure 1E:
FIG. 1E is a top view of the cell phone case.

Reference will now be made in greater detail to a preferred embodiment of the invention, an example of which is illustrated in the accompanying drawings. Wherever possible, the same reference numerals will be used throughout the drawings and the description to refer to the same or like parts.

FIGS. 1A-1D illustrate cell phone case 10 in accordance with the teachings of the present invention. Cell phone case 10 includes housing 11 formed of at least one wall 14 extending from rear surface 16. Housing 11 is generally rectangular. While housing 11 is illustrated herein as being generally rectangular in shape, those skilled in the art will recognize that the housing 11 could be manufactured in numerous different shapes.

Cell phone case 10 can have a size to cover a cell phone or personal data assistant. For example the cell phone can be a smart phone, such as for example an IPHONE manufactured by Apple or a Galaxy manufactured by Samsung. Cell phone case 10 can include camera opening 22, screen opening 24, ring/silent switch opening 25, volume button opening 26, headset jack opening 27, power cord opening 28, sleep/wake opening or button 29 which correspond to features of a cell phone received within cell phone case 10. It will be appreciated that openings of cell phone case 10 can be arranged dependent on the features of the cell phone received in the cell phone case.

Surface 40 of cell phone case 10 can be a textured surface. For example, surface 40 can include a plurality of micropores extending into surface 40 to create the textured surface. The textured surface can have a depth up to about 0.0015 inches.

Cell phone case 10 can be formed of a polymer. Cell phone case 10 can be formed of a plastic or thermoplastic material formed from the polymerization of polyurethane or olefins. Suitable polyolefins include polyethylene and polypropylene. An additive can be added to the plastic or thermoplastic material. In one embodiment, the additive can be added to a polyolefin used for injection molding of the cell phone case. A suitable thermoplastic material is polyurethane having about 60 to about 80 durometer. A flexible or rigid plastic material can be co-molded, over molded or insert molded with the plastic material.

Cell phone case 10 can be formed of polyurethane. The polyurethane can be a thermosetting or thermoplastic material. Thermoplastic materials that can be used to form cell phone case 10 include ethylene vinyl acetate and nylon.

A fragrance additive can be added to the plastic or thermoplastic material when forming cell phone case 10. The fragrance additive can comprise a fragrance and a solvent. Example fragrances include fruity, citrus, floral, powdery, aromatic, oriental, green and woody. A fragrance additive can be a fragrance oil for polymer. Example fragrance oil for polymers are manufactured by Agilex Fragrance, Piscataway N.J. The fragrance additive can be used in an amount of about 1% to about 5% by weight of the composition of the plastic or thermoplastic material. Preferably, the fragrance additive is used in an amount of about 2% by weight of the composition of the plastic or thermoplastic material.

Antimicrobial agents can be added to the plastic or thermoplastic material when forming cell phone case 10. The antimicrobial agents can comprise metal antimicrobial agents including silver, gold, platinum, copper, zinc or palladium. The antimicrobial agents can include metal cations. The preferred metal ion is silver ion. The antimicrobial agent can be provided in an effective amount capable of interacting with a colony of microbes for suppressing colonization or killing of the colony. Example microbes include bacteria of methicillin-resistant *staphylococcus aureus* (MRSA). The antimicrobial agents can be used in an amount of about 1% to about 5% by weight of the composition of the plastic or thermoplastic material. Preferably, the antimicrobial agent is used in an amount of about 2% by weight of the composition of the plastic or thermoplastic material.

The fragrance agent is blended into a plastic pre-polymer before molding of the plastic material into cell phone case. The antimicrobial agent is blended into a plastic pre-polymer before molding of the plastic material into cell phone case. Both the fragrance and the antimicrobial agent can be blended into a plastic pre-polymer before molding of the plastic material into cell phone case.

A colorant can be added to the plastic material for cell phone case 10.

Figure 2:
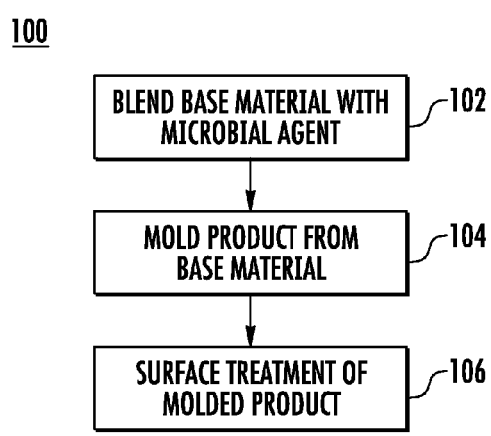
FIG. 2 is a flow diagram of a method for manufacturing a cell phone case including antimicrobial and/or fragrance in accordance with the teachings of the present invention.

A method for manufacturing cell phone case including fragrance and/or antimicrobial 100 is shown in FIG. 2. Fragrance is infused in a polymer prior to molding and the antimicrobial is added to the polymer prior to molding.

In block 102, the base material is blended with a fragrance and/or microbial agent. Example suitable microbial agents include silver, silver nano-particles, additives of silver such as are manufactured by Biomaster Antimicrobial Technology. The amount of the microbial agent used can be selected to increase the dielectric constant of the base material not to exceed the percolation threshold of the base material. An increased dielectric constant attracts negatively charged microbes providing improved ability of the base material to attract the microbes. The amount of microbial agent can be in the range of about 1% to about 25%.

The base material, such as a pre-polymer compound is blended with the fragrance and/or microbial agent using heat and high compression mixing simultaneously, thereby causing the microbial agent to be evenly distributed throughout the polymer compound. Blending in this manner retains the microbial agent between the polymer strand structures. The base material can blended at a temperature in the range of about 350 degrees F. to about 475 degrees F. at a pressure in the range of about 0 to about 1500 psi.

In block 104, the blended base material is molded by injection molding to form cell phone case 10. A flexible plastic material can be co-molded with the base material. The cavity used in the injection mold can be selected to be larger than the desired product for providing pressure reduction and voids in the formed product to achieve a reduced density of the product. The cavity used in the injection mold can have a runout area allowing for a pressure drop, to maximize the foaming action and providing a pressure reduction and voids in the formed product to achieve a reduced density of the product.

In block 106, the molded product of the cell phone case is surface treated to raise the surface tension that holds microbes to the cell phone case to improve retention of microbes. For example, the molded cell phone case can be flame treated or treated with corona discharge. Surface treatment can also include silk screening and sputter coating of a biologically active or electrically active agent. Surface treatment can also include hydrophilization spot coating to enhance the capability to absorb and retain moisture.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for manufacturing a cell phone case comprising the steps of:
   (a) blending a fragrance into a base material formed of a pre-polymer plastic to form a blended polymer compound, the blended polymer compound is blended with the fragrance using heat and high compression mixing simultaneously at a temperature in the range of 350 degrees F. to 475 degrees F. and at a pressure in the range of 0 to 1500 psi to form a blended polymer compound, the blended polymer compound results in the fragrance being infused or trapped in the polymer; and
   (b) molding the blended base material by injection molding to form the cell phone case,
   wherein after step (b) further comprising the step of surface treatment by means of flame or corona treatment of the surface of the cell phone case, wherein the surface treatment improves attraction or retention of microbes to the cell phone case.

2. The method of claim 1 wherein said fragrance is a fragrance oil for polymer.

3. The method of claim 1 further comprising blending an antimicrobial agent into the base material in step (a).

4. The method of claim 2 wherein said antimicrobial agent is a silver cation.

5. A method for manufacturing a cell phone case comprising the steps of:

(a) blending an antimicrobial agent into a base material formed of a pre-polymer compound, the pre-polymer compound is blended with the antimicrobial agent using heat and high compression mixing simultaneously at a temperature in the range of 350 degrees F. to 475 degrees F. and at a pressure in the range of 0 to 1500 psi to form a blended polymer compound, the blended polymer compound results in the antimicrobial agent being infused or trapped in the polymer; and (b) molding the blended base material by injection molding to form the cell phone case, wherein after step (b) further comprising the step of surface treatment by means of flame or corona treatment of the surface of the cell phone case, wherein the surface treatment improves attraction or retention of microbes to the cell phone case.

\* \* \* \* \*